US 9,843,987 B2

(12) United States Patent
Cui et al.

(10) Patent No.: US 9,843,987 B2
(45) Date of Patent: Dec. 12, 2017

(54) CONSUMER SERVICE CLOUD FOR IMPLEMENTING LOCATION-BASED SERVICES TO CONTROL SMART DEVICES

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Alan Blackburn, Woodstock, GA (US); Thomas A. Anschutz, Conyers, GA (US); Arthur Richard Brisebois, Cumming, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/739,356

(22) Filed: Jun. 15, 2015

(65) Prior Publication Data
US 2016/0366635 A1 Dec. 15, 2016

(51) Int. Cl.
| | |
|---|---|
| H04M 3/00 | (2006.01) |
| H04W 48/04 | (2009.01) |
| H04L 29/08 | (2006.01) |
| H04W 4/02 | (2009.01) |

(52) U.S. Cl.
CPC ........... *H04W 48/04* (2013.01); *H04L 67/306* (2013.01); *H04W 4/025* (2013.01)

(58) Field of Classification Search
CPC ...... H04W 48/04; H04W 4/025; H04L 67/306
USPC ........................................................ 455/419
See application file for complete search history.

(56) References Cited

U.S. PATENT DOCUMENTS

| | | | |
|---|---|---|---|
| 8,121,109 B2 | 2/2012 | Sibileau | |
| 8,306,634 B2 | 11/2012 | Nguyen et al. | |
| 8,620,476 B2 | 12/2013 | Lee et al. | |
| 8,963,713 B2 | 2/2015 | Dawes et al. | |
| 9,043,318 B2 * | 5/2015 | Kim | G06F 17/30277 707/724 |
| 9,146,123 B2 * | 9/2015 | Sathish | G01C 21/3626 |
| 9,148,484 B2 * | 9/2015 | Fraccaroli | H04W 4/02 |
| 2003/0100962 A1 | 5/2003 | Sumita et al. | |
| 2010/0127854 A1 | 5/2010 | Helvick et al. | |
| 2012/0172027 A1 | 7/2012 | Partheesh et al. | |

(Continued)

FOREIGN PATENT DOCUMENTS

KR 101493351 2/2015

*Primary Examiner* — Amancio Gonzalez
(74) *Attorney, Agent, or Firm* — Hartman & Citrin LLC

(57) ABSTRACT

Concepts and technologies are described herein for a consumer service cloud ("CSC") for implementing location-based services to control smart devices. According to one aspect disclosed herein, a CSC system can determine a cell identifier ("ID") associated with a location in which one or more smart devices resides. The smart device(s) can include one or more settings that can be adjusted remotely by the CSC system to control one or more operational aspects of the smart device(s). The CSC system can periodically receive a cell ID update that can include a current cell ID associated with a current cell in which a user equipment ("UE") is located. When the CSC system determines that the current cell ID matches the cell ID, the CSC system can generate a request to adjust the setting(s) to control the operational aspect(s) of the smart device(s) and can provide the request to the smart device(s).

14 Claims, 7 Drawing Sheets

(56) References Cited

U.S. PATENT DOCUMENTS

| | | |
|---|---|---|
| 2012/0302267 A1 | 11/2012 | Haines et al. |
| 2013/0052946 A1 | 2/2013 | Chatterjee et al. |
| 2014/0277762 A1 | 9/2014 | Drew |
| 2015/0061859 A1 | 3/2015 | Matsuoka et al. |
| 2015/0072674 A1 | 3/2015 | Shoemaker et al. |

* cited by examiner

CONSUMER SERVICE CLOUD FOR IMPLEMENTING LOCATION-BASED SERVICES TO CONTROL SMART DEVICES

BACKGROUND

Smart devices are electronic devices capable of communication via networks, often wireless, for the exchange of data. Smart devices are often user reconfigurable and might operate autonomously in some implementations. Smart devices are becoming increasingly popular as Internet of Things ("IoT") devices, and more particularly, to connected-home systems. Presently, smart devices are controlled based upon direct user input, time schedules, and/or proximity sensors. This control scheme limits the functionality of smart devices.

SUMMARY

Concepts and technologies are described herein for a consumer service cloud for implementing location-based services to control smart devices. According to one aspect disclosed herein, a consumer service cloud ("CSC") system can include one or more processors and one or more memory components. The memory component(s) can store instructions that, when executed by the processor(s) cause the CSC system to perform operations. In particular, the CSC system can determine a cell identifier ("ID") associated with a location in which one or more smart devices resides. This location may be referred to herein as the "home" cell ID for the smart device(s). The smart device(s) can include one or more settings. The settings can be adjusted remotely by the CSC system to control one or more operational aspects of the smart device(s). The CSC system can periodically receive a cell ID update. The cell ID update can include a current cell ID associated with a current cell in which a user equipment ("UE") is located. When the CSC system determines that the current cell ID matches the cell ID associated with the location in which the smart device(s) resides, the CSC system can generate a request to adjust the setting(s) to control the operational aspect(s) of the smart device(s). The CSC system can provide the request to the smart device(s) so that the smart device(s) can adjust the setting(s).

In some embodiments, the CSC system can determine a mobility pattern associated with the UE. The mobility pattern can be determined based upon the cell ID update that is periodically received. In these embodiments, the CSC system can determine, based upon the mobility pattern, that the current cell ID will match the home cell ID within a predefined time period. The CSC system can generate the request and can provide the request within the predefined time period.

In some embodiments, the CSC system can build a user profile for a user associated with the UE. The user profile can include one or more mobility patterns associated with the UE, the cell ID associated with the location in which the smart device(s) reside, a UE identifier, and one or more smart device identifiers associated with the smart device(s).

The location in which smart device(s) reside(s) can be a home location of the user. The cell ID can be a home cell ID associated with the UE. The CSC system can determine that the UE has left the home cell ID. In response to determining that the user equipment has left the home cell ID, the CSC system can generate a further request to re-adjust the setting to control the operational aspect(s) of the smart device(s) and can provide the further request to the smart device(s).

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
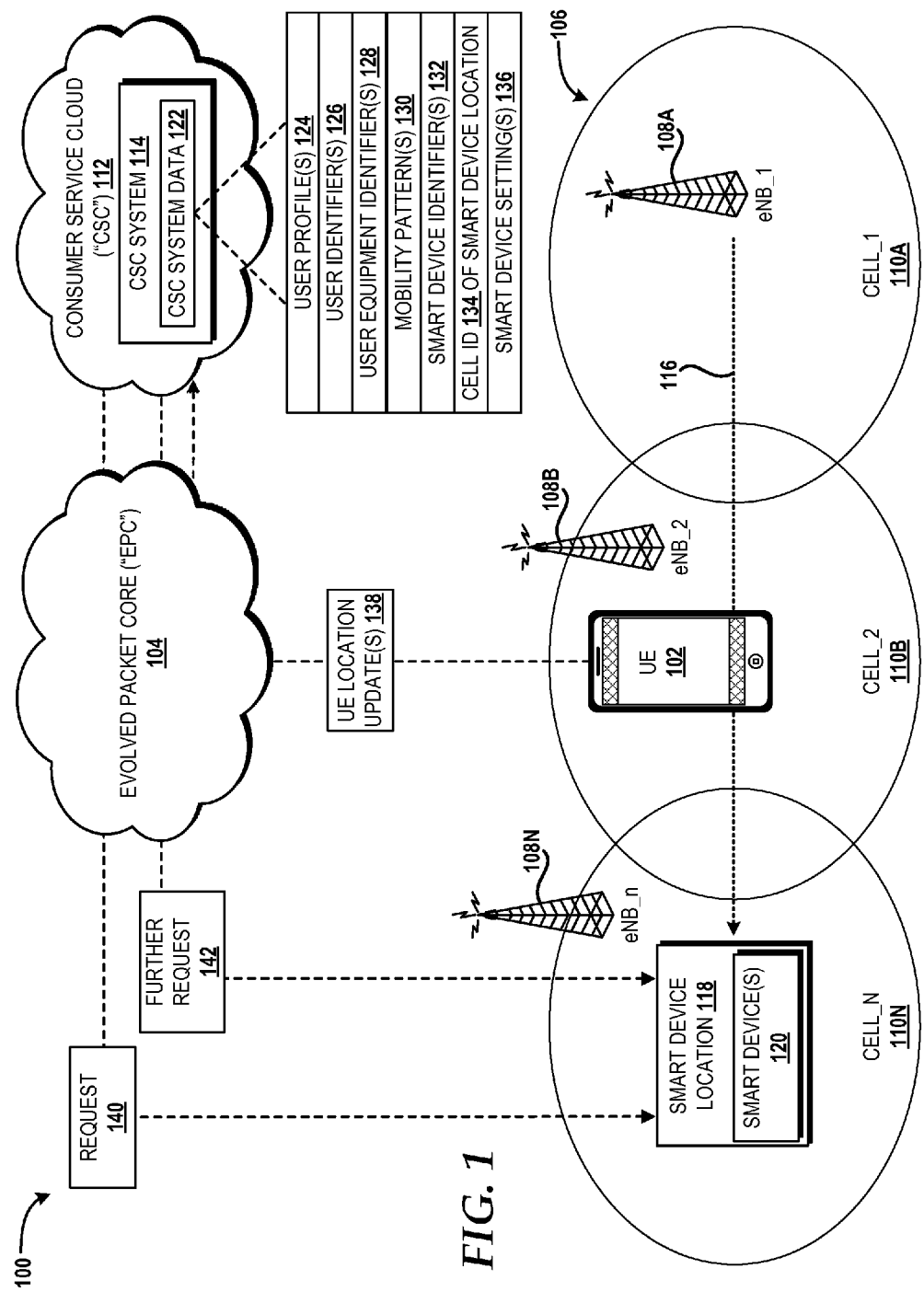
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of a consumer service cloud for implementing location-based services to control smart device operations will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The illustrated operating environment 100 includes a user equipment ("UE") 102 that is in communication with an evolved packet core ("EPC") 104 via an evolved Universal Mobile Telecommunications System Terrestrial Radio Access Network ("E-UTRAN") 106. The illustrated E-UTRAN 106 includes a plurality of eNode-Bs 108A-108N (eNB_1, eNB_2, . . . eNB_n; collectively "eNBs 108"), each of which serves an area shown as a corresponding cell 110A-110N (cell_1, cell_2, . . . cell_n; collectively "cells 110"). Although three eNBs and three corresponding cells are illustrated, implementations of the operating environment 100 may include a different number of eNBs and corresponding cells. As such, the illustrated example should not be construed as being limiting in any way.

The EPC 104 is in communication with a consumer service cloud ("CSC") 112 that hosts intelligence in one or more CSC systems 114 for consumer service management. The CSC 112 can be leveraged by the UE 102 for location-based services, including, but not limited, to control smart devices, as will be described in greater detail herein.

Figure 6:
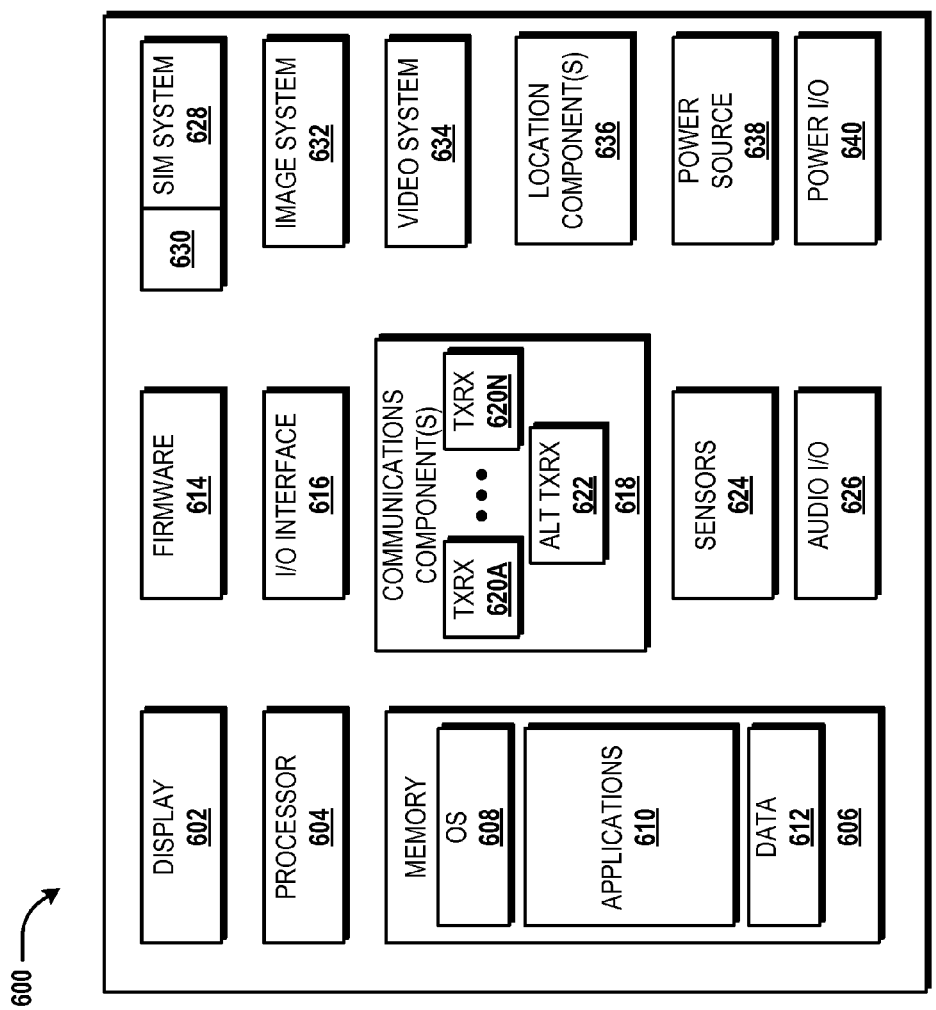
FIG. 6 is a block diagram illustrating an example mobile device capable of implementing aspects of the embodiments disclosed herein.

The UE 102 may be a cellular telephone, a feature phone, a smartphone, a mobile computing device, a portable television, a portable video game console, other computing device, or any other user equipment that is configured to communicate with one or more one or more RANs, such as the E-UTRAN 106, via one or more radio access components (best shown in FIG. 6). The radio access component(s) can include at least one transceiver that is compatible with Long-Term Evolution ("LTE") to enable communications with the E-UTRAN 106. The radio access component(s) can include one or more other transceivers to enable communications with other access networks (not shown) including, but not limited to, access networks that operate in accordance with Global System for Mobile communications ("GSM"), Code Division Multiple Access ("CDMA") ONE, CDMA2000, and various other Third Generation Partnership Project ("3GPP"). Moreover, the other transceiver(s) may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like. The radio access component(s) also can include one or more transceivers to enable communications with WI-MAX and/or WI-FI networks (not shown). As such, the UE 102 may be a multi-mode device capable of communicating with the E-UTRAN 106 and at least one other RAN.

The EPC 104 can include a serving gateway ("SGW"), a packet data network ("PDN") gateway ("PGW"), and a home subscriber server ("HSS"). The SGW can transport Internet Protocol ("IP") data traffic between the UE 102 and one or more external networks, including, for example, an IP multimedia subsystem ("IMS") network. The SGW connects the E-UTRAN 106 to the EPC 104 to allow IP data communications between the UE 102 and the EPC 104. The SGW also performs operations to facilitate handover among eNBs, such as the eNBs 108, within the E-UTRAN 106 and between other LTE and 3GPP access networks. The SGW is in communication with the PDN gateway. The PDN gateway interconnects the EPC 104 and external IP networks (i.e., PDNs—not shown). The PDN gateway routes IP packets to and from the PDNs. The PDN gateway also performs operations such as IP address/IP prefix allocation, policy control, and charging. In some implementations, the PDN gateway and the SGW are combined. The HSS is a database that contains user/subscriber information. The HSS also performs operations to support mobility management, call and session setup, user authentication, and access authorization.

The illustrated UE 102 is traveling in a direction of travel 116 through the E-UTRAN 106, and more particularly, from the cell_1 110A to the cell_2 110B, and finally arriving at a smart device location 118 located in the cell_N 110N. The smart device location 118 can be or can include any indoor environment, outdoor environment, or a combination thereof. Some example environments include, but are not limited to, buildings, single family homes, duplexes, triplexes, apartments, condominiums, stadiums, coliseums, theaters, tents, port-a-potties, stages, alleyways, subway tunnels, sewers, vehicle interiors, and the like. The smart device location 118 can include one or more smart devices 120.

The smart device(s) 120 can include electronic devices capable of communication via one or more wireless networks for the exchange of data. The wireless network(s) (not shown) can employ one or more wireless protocols, some examples of which include, but are not limited to, BLUETOOTH, WI-FI, LTE and/or other mobile telecommunications protocols, and the like. The smart device(s) 120 can be user reconfigurable and might operate autonomously in some implementations. Some examples of the smart device(s) 120 include, but are not limited to, home automation devices, home security devices, smartphones, tablet computers, slate computers, smart watches, smart bands, smart key chains, smart wallets, smart televisions, smart set-top-boxes, smart refrigerators and other smart appliances, and the like.

The CSC 112 may include servers, databases, networks, applications, and/or other computing resources that are utilized by one or more cloud computing service providers to provide a cloud computing service to one or more users (consumers). A cloud computing service is defined herein as a service provided in accordance with a cloud computing model that enables ubiquitous, convenient, on-demand network access to a shared pool of configurable computing resources that can be rapidly provisioned and released with minimal management effort or service provider interaction. A cloud infrastructure is defined herein as the collection of hardware and software that enables a cloud computing service.

In some embodiments, the CSC 112 is configured to provide, at least in part, Software as a Service ("SaaS"). SaaS is defined herein as the capability provided to the user to use the provider's application operating on a cloud infrastructure. The applications are accessed by the user via various client devices, such as the UE 102 and/or the smart devices 120, through either a thin client interface, such as a Web browser, or a program interface. The user does not manage or control the underlying cloud infrastructure including networks, servers, operating systems, storage, or individual application capabilities, with the possible exception of user-specific application configuration settings.

In some embodiments, the CSC 112 is configured to provide, at least in part, Platform as a Service ("PaaS"). PaaS is defined herein as the capability provided to the user to deploy onto a cloud infrastructure user-created or acquired applications created using programming languages, libraries, services, and/or tools supported by the provider. The user does not manage or control the underlying cloud infrastructure including networks, servers, operating systems, and storage, but has control over the deployed applications and possibly configuration settings for the application-hosting environment.

In some embodiments, the CSC 112 is configured to provide, at least in part, Infrastructure as a Service ("IaaS"). IaaS is defined herein as the capability provided to the user to provision processing, storage, networks, and other computing resources where the user is able to deploy and run arbitrary software, which can include operating systems and applications. The user does not manage or control the underlying cloud infrastructure, but has control over operating systems, storage, and deployed applications; and possibly limited control of select networking components (e.g., host firewalls).

In some embodiments, the CSC 112 is configured to provide, at least in part, a private cloud infrastructure. A private cloud infrastructure is defined herein as a cloud infrastructure that is provisioned for exclusive use by one user or a pre-defined group of two or more users. A private cloud infrastructure may be owned, managed, and operated by an organization (e.g., a telecommunications service provider), a third party, or some combination thereof. A private cloud infrastructure may exist on or off premises.

The CSC 112, and more particularly, the CSC system 114, can store, in a memory device (best shown in FIG. 5), CSC system data 122 that can include one or more user profiles 124, one or more user identifiers 126, one or more user equipment identifiers 128, one or more mobility patterns 130, one or more smart device identifiers 132, a cell ID 134 of the smart device location 118 (i.e., a "home" cell ID associated with the smart device location 118), and one or more smart device settings 136. Each of the user profiles 124 can include any data associated a particular user. The data can include at least a portion of the CSC system data 122 associated with the particular user.

Each of the user identifiers 126 can include a unique identifier that uniquely identifies a particular user. The user identifiers 126 each might include a unique combination of numbers, letters, and/or characters to identify a particular user. The user identifiers 126 each might include an international mobile subscriber identity ("IMSI"). The user identifiers 126 each might include a unique identifier for a user who subscribes to or otherwise utilizes one or more services, which might include a service provided, at least in part, via the smart device(s) 120.

Each of the user equipment identifiers 128 can include a unique identifier that uniquely identifies a particular UE, such as the UE 102. The user equipment identifiers 128 each might include a unique combination of numbers, letters, and/or characters. The user equipment identifiers 128 each might include an international mobile equipment identity ("IMEI").

Each of the mobility patterns 130 can include a pattern of movement by a UE, such as the UE 102, through the E-UTRAN 106. The mobility patterns 130 can be used to predict departure/arrival times of UEs from/to one or more locations, such as the smart device location 118, based upon visited cell history and detection. The visited cell history can include cell IDs associated with each cell that serves a location traversed by a UE.

Each of the smart device identifiers 132 can include a unique identifier that uniquely identifies a particular smart device. The smart device identifiers 132 each might include a combination of numbers, letters, and/or characters to identify a particular smart device.

The cell ID 134 of the smart device location 118 can include a unique identifier that uniquely identifies the cell 110N in which the smart device location 118 is located. The cell ID 134 might include a UTRAN cell ID ("LCID"), a CID, or the like.

Each of the smart device settings 136 can include a setting that controls, at least in part, one or more operational aspects of one or more smart devices, such as the smart device(s) 120. For example, the smart device 120 embodied as a smart thermostat, such as the NEST LEARNING THERMOSTAT, available from Nest Labs, Inc., might have one or more settings to control temperature, operation of an A/C unit, operation of a heating unit, operation of a heat pump unit, operation of a fan, or the like.

Example use cases for the CSC 112 implemented by the CSC system 114 will now be described. In these examples, a user (not shown) associated with the UE 102 is traveling to his/her home, which may be the smart device location 118 or may be located within the smart device location 118. The CSC system 114 has knowledge of the home serving cell (cell_N 110N in the illustrated example) associated with the user's home via the cell ID 134. The CSC system 114 also has knowledge of the smart device setting(s) 136.

As a first non-limiting example, the user desires to have the temperature adjusted in his/her home prior to arriving at the smart device location 118. While the UE 102 travels to the smart device location 118 (the user's home in this example) through the cells 110 of the E-UTRAN 106, the CSC 112 can receive UE location updates 138 from the EPC 104 regarding the location of the UE 102 as reported by the UE 102 to the EPC 104. The UE 102, an MME, an SGW, or a combination thereof can report, in the UE location update(s) 138, the cell ID or tracking area identity ("TAI") when the UE 102 enters each of the cells 110. As part of a handover procedure, the UE 102 reports the cell ID to the serving eNB 108 that reports to the EPC 104 that, in turn, reports to the CSC 112. In particular, the serving eNB 108 can report the cell ID to the MME and the SGW. The MME and the SGW can coordinate handover of the UE context and user data between the old and new eNB 108. Upon completion of this process, the MME and/or the SGW can report the cell change to the CSC 112.

If the UE 102 reports the cell ID 134 associated with the user's home serving cell (cell_N 110N in the illustrated example), the CSC system 114 can generate a request 140 and can send the request 140 to the smart device 120, which is embodied as a smart thermostat in this example. The request 140 can include one or more of the smart device settings 136 associated with the smart device 120 for when the user is traveling towards the smart device location 118. In this example, the request 140 particularly includes a temperature setting for when the user is traveling towards the smart device location 118. The smart device 120 can receive the request 140 and can adjust one or more operational aspects to change the temperature setting.

If the user leaves the smart device location 118, the UE 102 can continue to provide the location updates 138 as the UE 102 travels from the cell_N 110N to the cell_2 110B. It is contemplated that patterns of cell changes (for example on the way home) can be learned and referenced over time, thus leading to more accurate predictions of the user's intended destination. In response, the CSC system 114 can generate a further request 142 and can send the further request 142 to the smart device 120. The further request 142 can include one or more of the smart device settings 136 associated with the smart device 120 for when the user is traveling away from the smart device location 118. In this example, the further request 142 particularly includes a temperature setting for when the user is traveling away from the smart device location 118. The smart device 120 can receive the further request 142 and can adjust one or more operational aspects to change the temperature setting.

As a second non-limiting example, the user desires to disarm his/her home security system prior to arriving at the smart device location 118. While the UE 102 travels to the smart device location 118 (the user's home in this example) through the cells 110 of the E-UTRAN 106, the CSC 112 can receive the UE location updates 138 from the EPC 104 regarding the location of the UE 102 as reported by the UE 102 to the EPC 104. The UE 102 can report, in the UE location update(s) 138, the cell ID or TAI when the UE 102 enters each of the cells 110. If the UE 102 reports the cell ID 134 associated with the user's home serving cell (cell_N 110N in the illustrated example), the CSC system 114 can generate the request 140 and can send the request 140 to the smart device 120, which is embodied as a home security system in this example. The request 140 can include one or more of the smart device settings 136 associated with the smart device 120 for when the user is traveling towards the smart device location 118. In this example, the request 140 particularly includes a disarm setting for when the user is traveling towards the smart device location 118. The smart device 120 can receive the request 140 and can adjust one or more operational aspects to unarm the security system.

If the user leaves the smart device location 118, the UE 102 can continue to provide the location updates 138 as the UE 102 travels from the cell_N 110N to the cell_2 110B. In response, the CSC system 114 can generate the further request 142 and can send the further request 142 to the smart device 120. The further request 142 can include one or more of the smart device settings 136 associated with the smart device 120 for when the user is traveling away from the smart device location 118. In this example, the further request 142 particularly includes an arm/re-arm setting for when the user is traveling away from the smart device location 118. The smart device 120 can receive the further request 142 and can adjust one or more operational aspects to arm/re-arm the security system.

It should be understood that some implementations of the operating environment 100 may include additional functionality or include less functionality than described above. Thus, the illustrated embodiment should be understood as being illustrative, and should not be construed as being limiting in any way.

Figure 2:
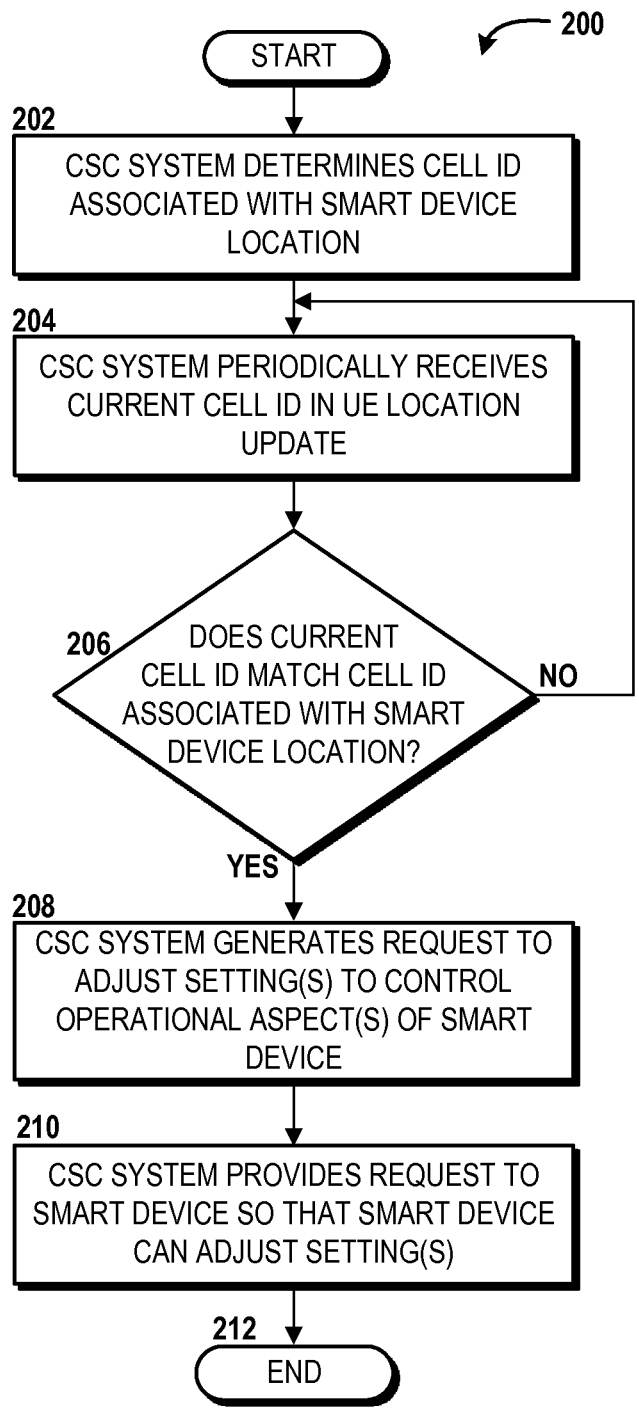
FIG. 2 is a flow diagram illustrating aspects of a method for remotely controlling one or more operational aspects of one or more smart devices, according to an illustrative embodiment.

Turning now to FIG. 2, a flow diagram illustrating aspects of a method 200 for remotely controlling one or more operational aspects of one or more smart devices, such as the smart device(s) 120, will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 5:
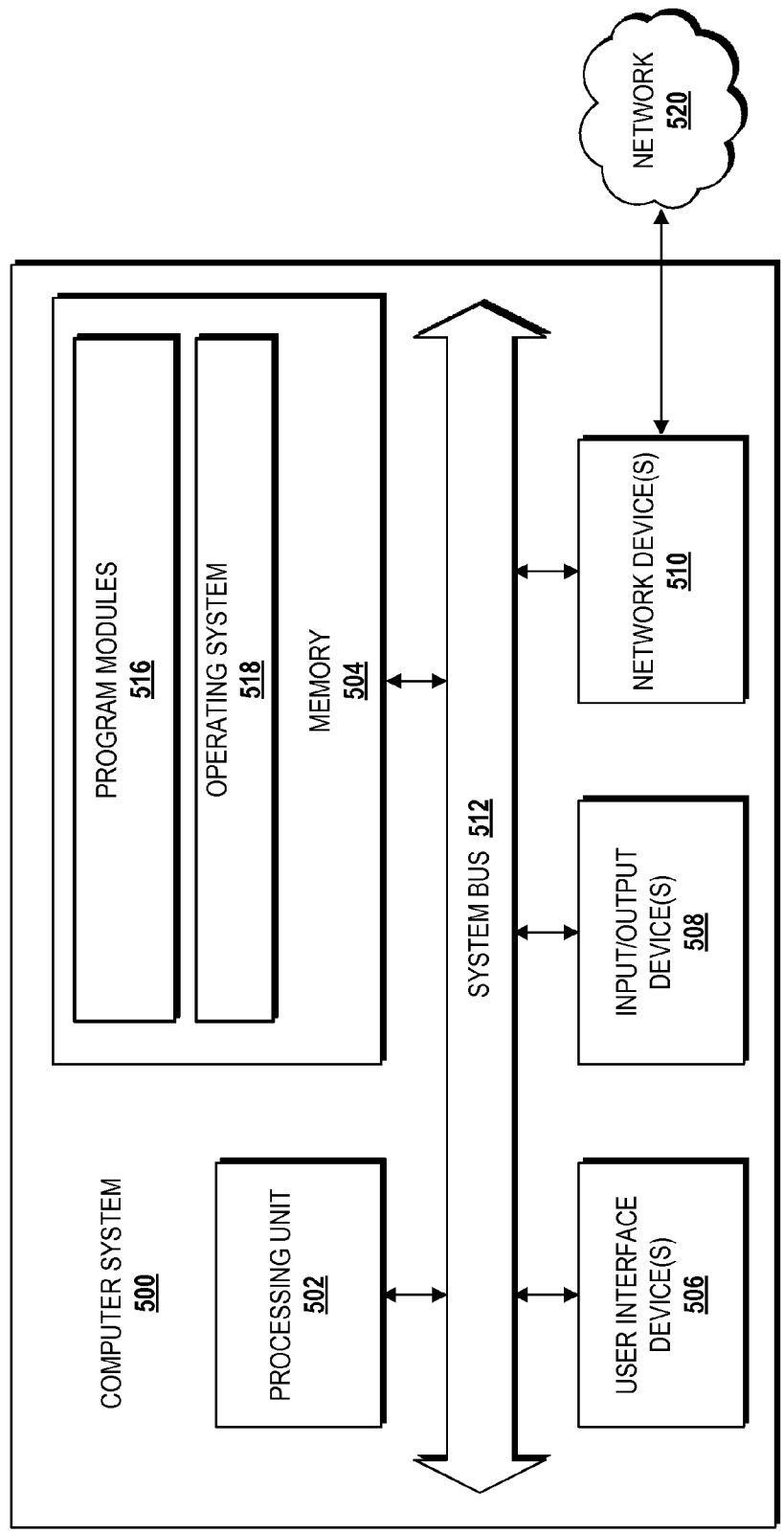
FIG. 5 is a block diagram illustrating an example computer system capable of implementing aspects of the embodiments presented herein.

The method 200 includes operations performed by the CSC system 114 via execution, by one or more processors, of one or more software program modules (best shown in FIG. 5). The method 200 is described with additional reference to FIG. 1. The method 200 begins and proceeds to operation 202, where the CSC system 114 determines a cell ID associated with a location of a smart device, such as the cell ID 134 associated with the smart device(s) 120 located in the smart device location 118. In some embodiments, the smart device(s) 120 can connect to the EPC 104 via the eNB_n 108N to provide the cell ID 134 associated therewith in the cell_N 110N, for example, as part of a setup process. Also during the setup process, the smart device(s) 120 can communicate with the CSC system 114 to associate the smart device identifier(s) 132 with one or more of the user profiles 124, establish which of the smart device settings 136 can be changed, associate the cell ID 134 with the smart device identifier(s), and/or perform other operations to establish communications between the smart device(s) 120 and the CSC system 114. The setup process might be manual based upon input from one or more users, semi-automatic based, at least in part, upon input from the user(s), or automatic, wherein the smart device(s) 120 communicate with the CSC system 114 automatically upon being powered on.

From operation 202, the method 200 proceeds to operation 204, where the CSC system 114 periodically receives the current cell ID associated with the cell 110 in which the UE 102 is located via the UE location update(s) 138. The UE 102 can provide the UE location update(s) 138 during, for example, a handover process as the UE 102 moves from cell to cell (e.g., from the cell_1 110A to the cell_2 110B and then from the cell_2 110B to the cell_N 110N). The UE 102 might provide the UE location update(s) 138 at other times, including, for example, when the UE 102 is powered on, when the UE 102 experiences a change in signal strength, and/or in response to a request from the EPC 104 (which might be prompted by a request from the CSC system 114).

From operation 204, the method 200 proceeds to operation 206, wherein the CSC system 114 determines whether the cell ID received in the UE location update 138 matches the cell ID 134 associated with the smart device location 118. The CSC system 114 might determine whether the cell ID received in the UE location update 138 matches the cell ID 134 associated with the smart device location 118 each time a UE location update 138 is received. The CSC system 114 might determine whether the cell ID received in the UE location update 138 matches the cell ID 134 associated with the smart device location 118 at some other interval, which may be based upon time or a number of UE location updates 138 received, for example. If, at operation 206, the CSC system 114 determines that the cell ID received in the UE location update 138 does not match the cell ID 134 associated with the smart device location 118, the method 200 returns to operation 204, where the CSC system 114 waits to receive another UE location update 138. If, however, at operation 206, the CSC system 114 determines that the cell ID received in the UE location update 138 does match the cell ID 134 associated with the smart device location 118, the method 200 proceeds to operation 208.

At operation 208, the CSC system 114 generates the request 140 to adjust one or more of the smart device settings 136 to control one or more operational aspects of the smart device(s) 120. From operation 208, the method 200 proceeds to operation 210, where the CSC system 114 provides the request 140 to the smart device(s) 120 via the EPC 104. From operation 210, the method 200 proceeds to operation 212, where the method 200 ends.

Figure 3:
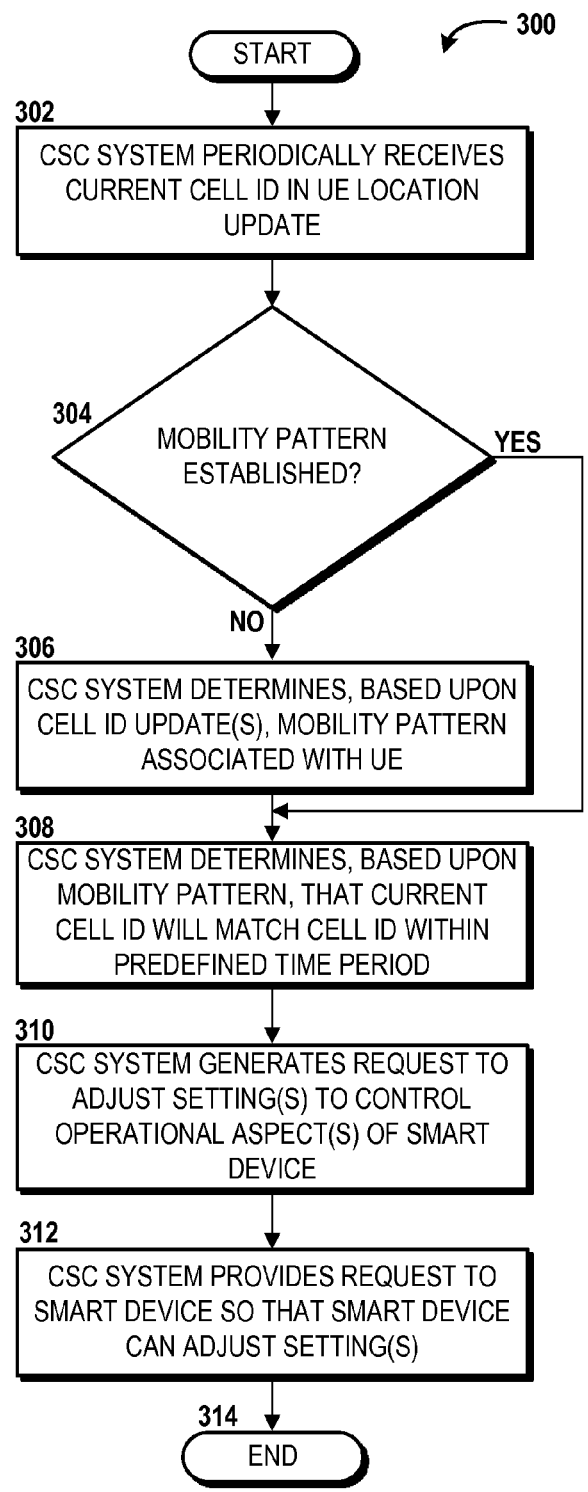
FIG. 3 is a flow diagram illustrating aspects of another method for remotely controlling one or more operational aspects of one or more smart devices, according to an illustrative embodiment.

Turning now to FIG. 3, a flow diagram illustrating aspects of a method 300 for remotely controlling one or more operational aspects of one or more smart devices, such as the smart device(s) 120, will be described, according to an illustrative embodiment. The method 300 includes operations performed by the CSC system 114 via execution, by one or more processors, of one or more software program modules (best shown in FIG. 5). The method 300 is described with additional reference to FIG. 1.

The method 300 begins and proceeds to operation 302, where the CSC system 114 periodically receives the current cell ID associated with the cell_110 in which the UE 102 is located via the UE location update(s) 138. The UE 102 can provide the UE location update(s) 138 during, for example, a handover process as the UE 102 moves from cell to cell (e.g., from the cell_1 110A to the cell_2 110B and then from the cell_2 110B to the cell_N 110N). The UE 102 might provide the UE location update(s) 138 at other times, including, for example, when the UE 102 is powered on, when the UE 102 experiences a change in signal strength, and/or in response to a request from the EPC 104 (which might be prompted by a request from the CSC system 114).

From operation 302, the method 300 proceeds to operation 304, where the CSC system 114 determines whether a mobility pattern, such as one of the mobility patterns 130 has been established for the UE 102. The mobility patterns 130 can include a pattern of movement by the UE 102, through the E-UTRAN 106. The mobility patterns 130 can be used to predict departure/arrival times of UEs from/to one or more locations, such as the smart device location 118, based upon visited cell history and detection. The visited cell history can include cell IDs associated with each cell that serves a location traversed by a UE. If, at operation 304, the CSC system 114 determines that a mobility pattern has not been established for the UE 102, the method 300 proceeds to operation 306, where the CSC system 114 determines, based upon the UE location update(s) 138, a mobility pattern associated with the UE 102. The CSC system 114 can then store the newly determined mobility pattern as one of the mobility patterns 130 associated with the UE 102.

From operation 306, or if the CSC system 114 determines, at operation 304, that a mobility pattern 130 has been established for the UE 102, the method 300 proceeds to operation 308. At operation 308, the CSC system 114 determines based at least in part upon the mobility pattern 130 that a current cell ID associated with the location of the UE 102 will match the cell ID 134 associated with the smart device location 118 within a predefined time period.

From operation 308, the method 300 proceeds to operation 310, where the CSC system 114 generates the request 140 to adjust one or more of the smart device settings 136 to control one or more operational aspects of the smart device(s) 120. From operation 310, the method 200 proceeds to operation 312, where the CSC system 114 provides the request 140 to the smart device(s) 120 via the EPC 104. From operation 312, the method 300 proceeds to operation 314, where the method 300 ends.

Figure 4:
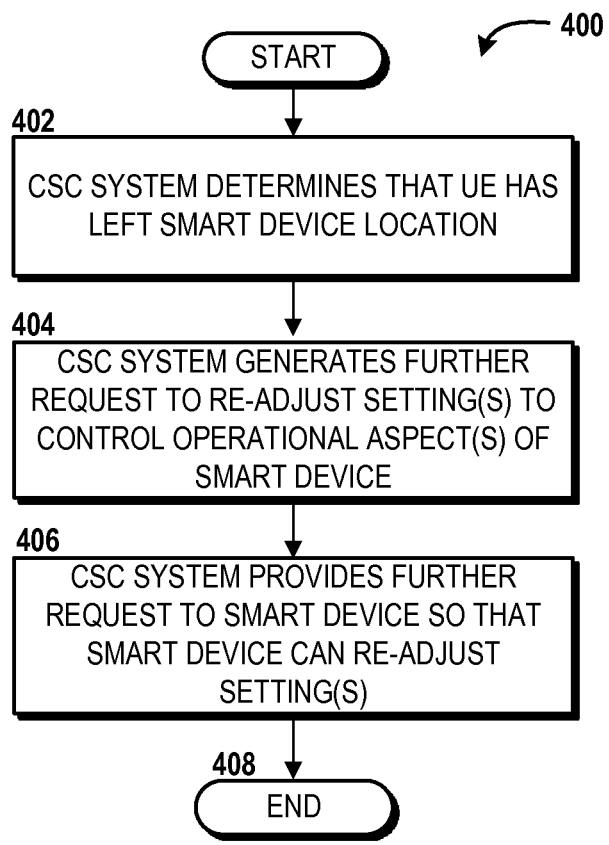
FIG. 4 is a flow diagram illustrating aspects of yet another method for remotely controlling one or more operational aspects of one or more smart devices, according to an illustrative embodiment.

Turning now to FIG. 4, a flow diagram illustrating aspects of a method 400 for remotely controlling one or more operational aspects of one or more smart devices, such as the smart device(s) 120, will be described, according to an illustrative embodiment. The method 400 includes operations performed by the CSC system 114 via execution, by one or more processors, of one or more software program modules (best shown in FIG. 5). The method 400 is described with additional reference to FIG. 1.

The method 400 begins and proceeds to operation 402, where the CSC system 114 determines that the UE 102 has left the smart device location 118. For example, the CSC system 114 can receive one of the UE location updates 138 during, for example, a handover process as the UE 102 moves from the smart device location 118 in the cell_N 110N to the cell_2 110B. The UE 102 might provide the UE location update(s) 138 at other times, including, for example, when the UE 102 is powered on, when the UE 102 experiences a change in signal strength, and/or in response to a request from the EPC 104 (which might be prompted by a request from the CSC system 114).

From operation 402, the method 400 proceeds to operation 404, where the CSC system 114 generates the further request 142 to adjust one or more of the smart device settings 136 to control one or more operational aspects of the smart device(s) 120. From operation 404, the method 400 proceeds to operation 406, where the CSC system 114 provides the further request 142 to the smart device(s) 120 via the EPC 104. From operation 406, the method 400 proceeds to operation 408, where the method 400 ends.

FIG. 5 is a block diagram illustrating a computer system 500 configured to provide the functionality in accordance with various embodiments of the concepts and technologies disclosed herein. In some implementations, the UE 102, the smart device(s) 120, the CSC system 114, and/or the eNBs 108 can utilize an architecture that is the same as or similar to the architecture of the computer system 500, or a modified version thereof. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 518 and one or more program modules 516. The operating system 518 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform one or more of the methods 200, 300, 400 or at least a portion thereof, described in detail above with respect to FIGS. 2-4, respectively. According to embodiments, the program modules 516 may be embodied in hardware, software, firmware, or any combination thereof. Although not shown in FIG. 5, it should be understood that the memory 504, in embodiments that the CSC system 114 is configured like the computer system 500, also can be configured to store at least a portion of the CSC system data 122, and/or other data.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 520, which can include, for example, the EPC 104 and the E-UTRAN 106. Examples of the network devices 510 include, but are not limited to, a modem, a radio frequency ("RF") or infrared ("IR") transceiver, a telephonic interface, a bridge, a router, or a network card. The network 520 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 520 may be a wired network such as, but not limited to, a wide area network ("WAN"), a wired LAN such as provided via Ethernet, a wired personal area network ("PAN"), or a wired metropolitan area network ("MAN").

Turning now to FIG. 6, an illustrative mobile device 600 and components thereof will be described. In some embodiments, the UE 102 described above with reference to FIG. 1 can be configured as and/or can have an architecture similar or identical to the mobile device 600 described herein in FIG. 6. It should be understood, however, that the UE 102 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a UI application (not illustrated in FIG. 4).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600.

According to various embodiments, the applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks described above herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA, CDMAONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, IRDA, NFC, other RF technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from GPS devices, A-GPS devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
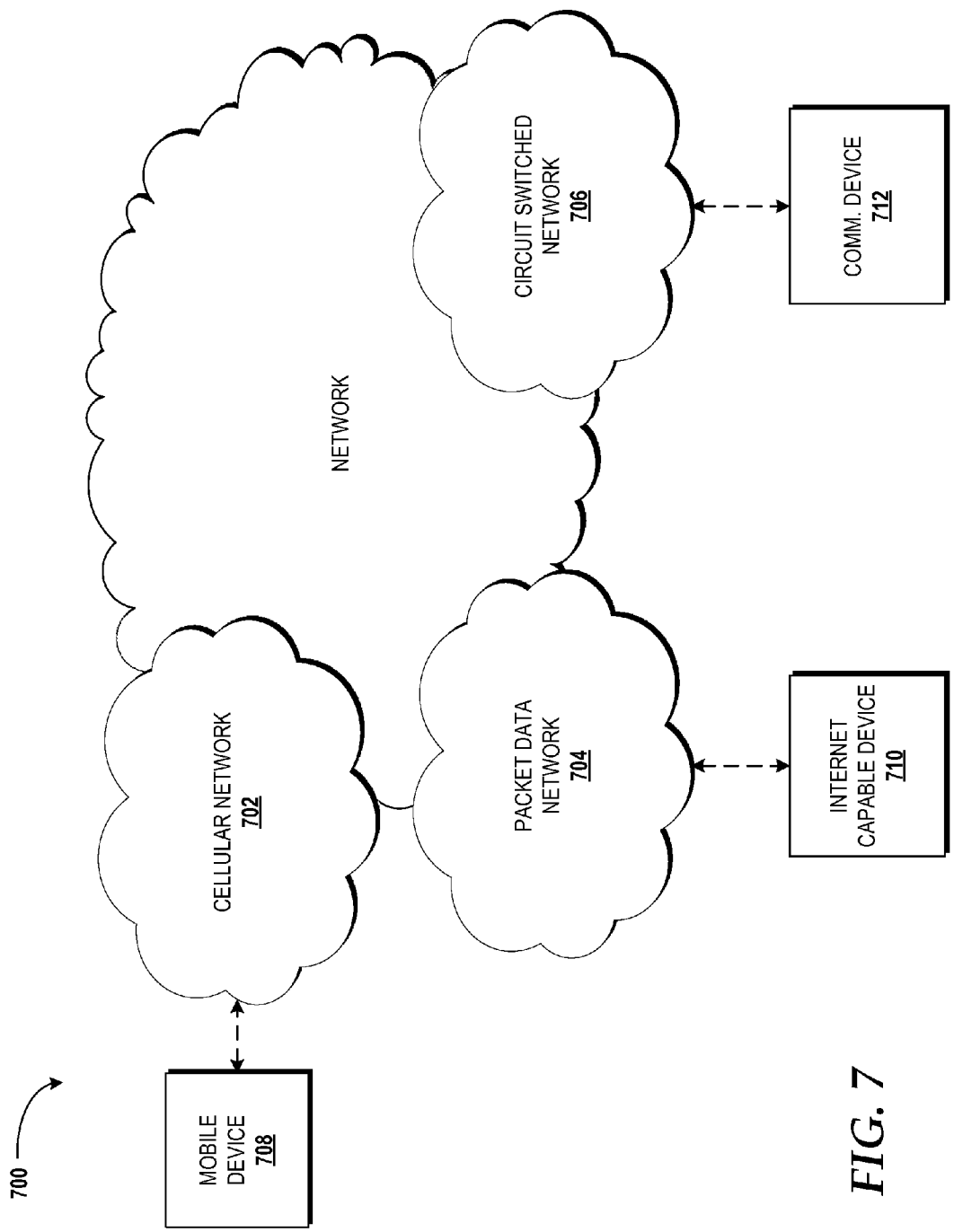
FIG. 7 schematically illustrates a network, according to an illustrative embodiment.

Turning now to FIG. 7, additional details of a network 700 are illustrated, according to an illustrative embodiment. The network 700 includes a cellular network 702, a packet data network 704, for example, the Internet, and a circuit switched network 706, for example, a publicly switched telephone network ("PSTN"). The cellular network 702 includes various components such as, but not limited to, RANs (e.g., the E-UTRAN 106), BTSs, NodeBs or eNodeBs (e.g., the eNodeB 108), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), the EPC 104, the other EPC functions, and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, the UE 102, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards such as LTE, or the like, as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, the UE 102, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, the UE 102, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 700 is used to refer broadly to any combination of the networks 702, 704, 706. It should be appreciated that substantially all of the functionality described with reference to the network 700 can be performed by the cellular network 702, the packet data network 704, and/or the circuit switched network 706, alone or in combination with other networks, network elements, and the like.

Based on the foregoing, it should be appreciated that concepts and technologies have been disclosed herein for a consumer service cloud for implementing location-based services to control smart device operations. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A consumer service cloud system comprising:
a processor; and
a memory that stores instructions that, when executed by the processor, cause the consumer service cloud system to perform operations, comprising
determining a cell ID associated with a location in which a smart device resides,
wherein the smart device comprises a setting that can be adjusted remotely, based upon a current cell in which a user equipment associated with the smart device is located, to control an operational aspect of the smart device, and
wherein the user equipment comprises a computing device different from the smart device, wherein the user equipment is configured to communicate with a radio access network,
periodically receiving a cell ID update comprising a current cell ID associated with the current cell in which the user equipment is located,
determining, based at least in part on the cell ID update periodically received, a mobility pattern associated with the user equipment, wherein the mobility pattern associated with the user equipment comprises a pattern of movement by the user equipment through the radio access network, wherein the pattern of movement by the user equipment indicates at least one of a movement of the user equipment towards the location in which the smart device resides or a movement of the user equipment away from the location in which the smart device resides,
determining, based at least in part on the mobility pattern associated with the user equipment, that the user equipment will arrive at the location in which the smart device resides within a predefined time period,
generating a request to adjust the setting to control the operational aspect of the smart device, and
providing, within the predefined time period, the request to the smart device so that the smart device can adjust the setting to control the operational aspect of the smart device.

2. The consumer service cloud system of claim 1, wherein determining, based at least in part on the mobility pattern associated with the user equipment, that the user equipment will arrive at the location in which the smart device resides within the predefined time period comprises determining, based at least in part on the mobility pattern associated with the user equipment, that the current cell ID will match the cell ID associated with the location in which the smart device resides within the predefined time period.

3. The consumer service cloud system of claim 1, wherein the operations further comprise building a user profile for a user associated with the user equipment, wherein the user profile comprises the mobility pattern, the cell ID, a user equipment identifier, and a smart device identifier.

4. The consumer service cloud system of claim 1, wherein the location comprises a home location and the cell ID comprises a home cell ID associated with the user equipment.

5. The consumer service cloud system of claim 4, wherein the operations further comprise:
determining that the user equipment has left the home cell ID; and in response to determining that the user equipment has left the home cell ID,
generating a further request to re-adjust the setting to control the operational aspect of the smart device, and
providing the further request to the smart device so that the smart device can re-adjust the setting.

6. A method comprising:
determining, by a consumer service cloud system comprising a processor, a cell ID associated with a location in which a smart device resides,
  wherein the smart device comprises a setting that can be adjusted remotely, based upon a current cell in which a user equipment associated with the smart device is located, to control an operational aspect of the smart device, and
  wherein the user equipment comprises a computing device different from the smart device, wherein the user equipment is configured to communicate with a radio access network;
periodically receiving, by the consumer service cloud system, a cell ID update comprising a current cell ID associated with the current cell in which the user equipment is located;
determining, by the consumer service cloud system, based at least in part on the cell ID update periodically received, a mobility pattern associated with the user equipment, wherein the mobility pattern associated with the user equipment comprises a pattern of movement by the user equipment through the radio access network, wherein the pattern of movement by the user equipment indicates at least one of a movement of the user equipment towards the location in which the smart device resides or a movement of the user equipment away from the location in which the smart device resides;
determining, by the consumer service cloud system, based at least in part on the mobility pattern associated with the user equipment, that the user equipment will arrive at the location in which the smart device resides within a predefined time period;
generating, by the consumer service cloud system, a request to adjust the setting to control the operational aspect of the smart device; and
providing, by the consumer service cloud system, within the predefined time period, the request to the smart device so that the smart device can adjust the setting to control the operational aspect of the smart device.

7. The method of claim 6, wherein determining, based at least in part on the mobility pattern associated with the user equipment, that the user equipment will arrive at the location in which the smart device resides within the predefined time period comprises determining, based at least in part on the mobility pattern associated with the user equipment, that the current cell ID will match the cell ID associated with the location in which the smart device resides within the predefined time period, and wherein generating the request comprises generating the request within the predefined time period.

8. The method of claim 6, further comprising building a user profile for a user associated with the user equipment, wherein the user profile comprises the mobility pattern, the cell ID, a user equipment identifier, and a smart device identifier.

9. The method of claim 6, wherein the location comprises a home location and the cell ID comprises a home cell ID associated with the user equipment.

10. The method of claim 9, further comprising:
determining that the user equipment has left the home cell ID; and
in response to determining that the user equipment has left the home cell ID,
generating a further request to re-adjust the setting to control the operational aspect of the smart device, and
providing the further request to the smart device so that the smart device can re-adjust the setting.

11. A computer-readable storage medium having instructions stored thereon that, when executed by a processor of a consumer service cloud system, cause the consumer service cloud system to perform operations comprising:
determining a cell ID associated with a location in which a smart device resides,
  wherein the smart device comprises a setting that can be adjusted remotely, based upon a current cell in which a user equipment associated with the smart device is located, to control an operational aspect of the smart device, and
  wherein the user equipment comprises a computing device different from the smart device, wherein the user equipment is configured to communicate with a radio access network;
periodically receiving a cell ID update comprising a current cell ID associated with the current cell in which the user equipment is located;
determining, based at least in part on the cell ID update periodically received, a mobility pattern associated with the user equipment, wherein the mobility pattern associated with the user equipment comprises a pattern of movement by the user equipment through the radio access network, wherein the pattern of movement by the user equipment indicates at least one of a movement of the user equipment towards the location in which the smart device resides or a movement of the user equipment away from the location in which the smart device resides;
determining, based at least in part on the mobility pattern associated with the user equipment, that the user equipment will arrive at the location in which the smart device resides within a predefined time period;
generating a request to adjust the setting to control the operational aspect of the smart device; and
providing, within the predefined time period, the request to the smart device so that the smart device can adjust the setting to control the operational aspect of the smart device.

12. The computer-readable storage medium of claim 11, wherein determining, based at least in part on the mobility pattern associated with the user equipment, that the user equipment will arrive at the location in which the smart device resides within the predefined time period comprises determining, based at least in part on the mobility pattern associated with the user equipment, that the current cell ID will match the cell ID associated with the location in which the smart device resides within the predefined time period, and wherein generating the request comprises generating the request within the predefined time period.

13. The computer-readable storage medium of claim 11, wherein the operations further comprise building a user profile for a user associated with the user equipment, wherein the user profile comprises the mobility pattern, the cell ID, a user equipment identifier, and a smart device identifier.

14. The computer-readable storage medium of claim 11, wherein the operations further comprise:
   determining that the user equipment has left a home cell ID; and
   in response to determining that the user equipment has left the home cell ID,
      generating a further request to re-adjust the setting to control the operational aspect of the smart device, and
      providing the further request to the smart device so that the smart device can re-adjust the setting.

* * * * *